US009603083B2

(12) United States Patent
Yang et al.

(10) Patent No.: US 9,603,083 B2
(45) Date of Patent: Mar. 21, 2017

(54) METHOD, DEVICE AND SYSTEM FOR SELECTING SERVICE CELL

(76) Inventors: Yi Yang, Beijing (CN); Wei Bao, Beijing (CN); Li Chen, Beijing (CN)

(*) Notice: Subject to any disclaimer, the term of this patent is extended or adjusted under 35 U.S.C. 154(b) by 1081 days.

(21) Appl. No.: 13/578,273

(22) PCT Filed: Jan. 31, 2011

(86) PCT No.: PCT/CN2011/070842
§ 371 (c)(1),
(2), (4) Date: Aug. 10, 2012

(87) PCT Pub. No.: WO2011/098019
PCT Pub. Date: Aug. 18, 2011

(65) Prior Publication Data
US 2012/0315913 A1 Dec. 13, 2012

(30) Foreign Application Priority Data
Feb. 10, 2010 (CN) .......................... 2010 1 0110958

(51) Int. Cl.
*H04W 36/00* (2009.01)
*H04W 48/16* (2009.01)
(Continued)

(52) U.S. Cl.
CPC ....... *H04W 48/16* (2013.01); *H04W 36/0061* (2013.01); *H04W 36/08* (2013.01);
(Continued)

(58) Field of Classification Search
CPC ... H04W 48/16; H04W 84/047; H04W 36/08; H04W 84/005; H04W 88/04;
(Continued)

(56) References Cited

U.S. PATENT DOCUMENTS

2009/0303918 A1* 12/2009 Ma ....................... H04B 7/2606
370/315
2010/0061339 A1* 3/2010 Kim .................. H04W 36/0005
370/331
(Continued)

FOREIGN PATENT DOCUMENTS

CN 101170342 A 4/2008
CN 101291527 A 10/2008
(Continued)

OTHER PUBLICATIONS

International Search Report issued in International Application No. PCT/CN2011/070842, dated May 12, 2011.
(Continued)

*Primary Examiner* — Olumide T Ajibade Akonai
(74) *Attorney, Agent, or Firm* — Handal & Morofsky, LLC

(57) ABSTRACT

The present invention discloses the method, equipment and system for selecting a donor cell, and the method comprises the following steps: a relay node acquires the donor cell configuration information for the relay node; if the relay node determines, based on the donor cell configuration information, that the currently serving cell is listed in the donor cell configuration information, the relay node continues to work in the cell; otherwise, the relay node selects another cell listed in the donor cell configuration information to access. The present invention can improve the controllability of the selection of a donor cell by a relay node, thereby causing the relay node to quickly select a donor cell and access to the donor cell.

15 Claims, 8 Drawing Sheets

(51) Int. Cl.
*H04W 48/08* (2009.01)
*H04W 84/04* (2009.01)
*H04W 36/08* (2009.01)
*H04W 84/00* (2009.01)

(52) U.S. Cl.
CPC .......... *H04W 48/08* (2013.01); *H04W 84/005* (2013.01); *H04W 84/047* (2013.01)

(58) Field of Classification Search
CPC . H04W 48/08; H04W 36/0061; H04W 48/10; H04W 88/08
USPC .................................................. 455/436–444
See application file for complete search history.

(56) References Cited

U.S. PATENT DOCUMENTS

| | | | | |
|---|---|---|---|---|
| 2010/0097978 | A1* | 4/2010 | Palanki | H04L 1/1867 370/315 |
| 2010/0167743 | A1* | 7/2010 | Palanki | H04B 7/155 455/436 |
| 2011/0194483 | A1* | 8/2011 | Ji | H04W 36/0033 370/315 |
| 2011/0230187 | A1* | 9/2011 | Jeon | H04B 7/2606 455/434 |
| 2012/0315916 | A1* | 12/2012 | Van Phan | H04W 36/08 455/442 |

FOREIGN PATENT DOCUMENTS

| | | | |
|---|---|---|---|
| CN | 101483912 | A * | 7/2009 |
| CN | 101483912 | A | 7/2009 |
| WO | 2004/080104 | A1 | 9/2004 |

OTHER PUBLICATIONS

IEEE 802.16 Broadband Wireless Access Working Group, IEEE C802.16j-07/097r5: RS Initial Network Entry and Re-entry. Institute of Electrical and Electronics Engineers (IEEE). Mar. 15, 2007 sections 3.1, 3.3.
Office Action dated May 9, 2013 in Chinese Patent Application No. 201010110958.8 (In Chinese).
Office Action dated May 9, 2013 in Chinese Patent Application No. 201010110958.8 (English Translation).
Office Action dated Dec. 5, 2012 in Chinese Patent Application No. 201010110958.8 (In Chinese).
Office Action dated Dec. 5, 2012 in Chinese Patent Application No. 201010110958.8 (English Translation).

* cited by examiner

METHOD, DEVICE AND SYSTEM FOR SELECTING SERVICE CELL

This application claims the priority to the Chinese Patent Application No. 201010110958.8 titled "Method, Equipment and System for Selecting a Donor Cell" filed to the Patent Office of the People's Republic of China on Feb. 10, 2010, the entire disclosure of which is incorporated by reference herein.

FIELD OF THE INVENTION

The present invention relates to the field of wireless communication technology, in particular to the method, equipment and system for selecting a donor cell.

BACKGROUND OF THE INVENTION

In the future mobile communication system, for example, Beyond Third Generation (B3G) or Long Term Evolution-Advanced (LTE-A), the system will provide a higher peak data rate and cell throughput with larger bandwidth. Currently, few un-used frequency band below 2 GHz is left, thus partial or all bandwidth needed by the B3G system can be found only on higher frequency range, 3 GHz or higher for instance. The higher the frequency range is, the quicker the attenuation speed of radio wave propagation becomes, and the shorter the transmission range becomes. Thereby, under the same coverage area, in order to ensure continuous coverage, more eNBs are required. But the high cost of eNBs undoubtedly increases the network deployment cost. For the purpose of reducing the cost and improving coverage, the vendors and standardization organizations start to introduce relay into the cellular communication system.

FIG. 1 is overall LTE-A network architecture with deployed Relay Node (RN), which is wirelessly connected to the core network via the donor cell under a Donor Evolved Node B (DeNB). There is no direct wired interface between the RN and core network and each RN can manage one or more cells. In this architecture, the interface between User Equipment (UE) and RN is called Uu, while that between RN and eNB is Un.

In the architecture, RN has dual roles:

First, RN has a role as a UE. The RN startup procedure is similar to legacy UE attachment procedure. RN has its own Serving-Gateway/PDN-Gateway (S-GW/P-GW) and control plane node Mobility Management Entity (MME);

Second, RN has a role as an eNB for UE. The downlink data of the UE needs to be sent to the serving base station of the UE, i.e. RN, from the SGW/PGW of the UE, and then RN sends the downlink data to the UE via a Uu. According to the discussion in 3rd Generation Partnership Project (3GPP), there are 4 alternative architectures at present.

As shown in FIG. 2, the RN startup procedure is described as (take architecture 1 and 3 for example): radio resource control (RRC) connection is established between the RN and the DeNB; the RN sends Attach Request to the MME; the MME acquires the subscription data of the RN from Home Subscriber Server (HSS) to authenticate the RN; if the authentication is successful, the MME creates default bearer in the S-GW/P-GW for the RN, and then sends an initial UE context setup request message to the DeNB and creates context of RN in DeNB; and then the DeNB sends a RRC connection reconfiguration message to the RN, containing an attach accept message sent to RN by MME; the RN replies RRC connection reconfiguration complete, thus the RN establishes the basic IP connection.

Then, Operation & Maintenance (O&M) downloads the node configuration information to the RN to configure the RN. The RN can work normally like the base station after having established necessary S1 interface and X2 interface.

FIG. 3 shows the RN startup procedure based on architecture 2. Different from the procedure as shown in FIG. 2, in architecture 1 and 3, RN has separate S-GW and P-GW. During RN attach, MME sends create default bearer request to the S-GW/P-GW of RN; in architecture 2, the S-GW and P-GW functions of RN are integrated in the DeNB, so the create default bearer request sent by the MME is sent to DeNB. Besides in architecture 1 and 3, as an eNB, RN needs to establish X2 interfaces with other eNBs and S1 interfaces with MMEs; while in architecture 2 and 4, RN only needs to establish an X2 interface and an S1 interface with the DeNB. To other eNBs and core networks, RN is invisible. The other eNBs and core networks consider the RN as a cell under the DeNB. The DeNB only needs to update the established X2/S1 connection: to add a new cell to other eNBs, and to register a new TAC to the MME if the tracking Area Code (TAC) supported by RN is different from that supported by DeNB.

Currently, scenarios where UE needs to select a cell include: power up, re-entering into the coverage area, RRC connection release and RRC re-establishment. As shown in FIG. 4, a UE, after power up, begins to search Evolved Universal Terrestrial Radio Access (E-UTRA) channel and reports all available Public Land Mobile Networks (PLMN) to non-Access Stratum (NAS), which automatically or manually selects a PLMN and indicate it to an Access Stratum (AS). The UE selects a suitable cell or acceptable cell that meets S criterion on the selected PLMN to camp on, and then the cell reselection procedure starts in order to select a better cell to camp on and avoid unnecessary handover after accessing to the cell. Wherein, two cell selection procedures are available:

(1) Initial Cell selection: This procedure requires no prior knowledge of which RF channels are E-UTRA carriers. The UE scans all the radio frequency channels in E-UTRA bands and finds out at least the strongest cell on each carrier frequency. The UE reads the PLMN of the cell from the system information of the cell. The UE firstly finds a suitable cell, and then an acceptable cell if no suitable cell is found. Once either of them is found, the UE camps on the cell and then the cell reselection starts.

(2) Stored Information Cell Selection: This procedure requires stored information of carrier frequencies and optionally also information on cell parameters, from previously received measurement control information elements or from previously detected cells. But if no suitable cell is found, the initial cell selection starts.

A UE can obtain normal service when camped on a suitable cell. It may obtain limited services when camped on an acceptable cell, such as emergency call.

A UE, after camping on a suitable cell, usually needs to request location registration to the network through attachment procedure, in order to use services requiring registration, such as normal voice call service and WAP. A UE under a restricted status can only make emergency calls.

If a UE finds a more suitable cell in an idle state, it re-selects and camps on such cell.

In the procedure of realizing the objects of the present invention, at least the following problems existing in the current technologies were found:

Though RN has the function of a UE, in one aspect, if RN selects the donor cell according to the current mechanism that a UE selects a cell by S criterion, the selected donor cell may not be expected by the operator; in other aspect, as an eNB, RN needs to enter connected state after start-up as soon as possible in order to serve the UE timely. Unlike a UE, which performs selects cell selection/reselection frequently, an RN needs to select a cell more accurately and rapidly, thus the current cell selection mechanism for a UE is not exactly applicable to an RN to select a suitable donor cell.

SUMMARY OF THE INVENTION

The embodiments of the present invention put forward a technical solution for selecting a donor cell, to enhance the controllability of the selection of a donor cell by the relay node.

The technical solution disclosed by the embodiments of the present invention comprises:

A method for a donor cell selection includes the following steps:

A relay node acquires the donor cell configuration information for the relay node;

If the relay node determines, based on the donor cell configuration information, that the currently serving cell is indicated in the donor cell configuration information, the relay node may continue to work in the cell; otherwise, the relay node selects the cell indicated in the donor cell configuration information to access to.

A relay node apparatus comprises:

An acquisition module for a relay node to acquire the donor cell configuration information for the relay node;

A determination module for instructing the relay node to continue to work in the cell if it determines, based on the donor cell configuration information, that the current serving cell is indicated in the donor cell configuration information; otherwise, instructing the relay node to select a cell indicated in the donor cell configuration information to access to;

A processing module for causing the relay node to continue working in the current cell or making the relay node access to a cell indicated in the donor cell configuration information according to the judgment of the determination module.

An eNB apparatus comprises one of the following modules:

A reselection processing module for instructing the relay node to reselect the cell indicated in the donor cell configuration information according to the donor cell configuration information for the relay node reported by the relay node.

A handover processing module for handing over the relay node to the cell indicated in the donor cell configuration information according to the donor cell configuration information for the relay node reported by the relay node.

In the aforesaid embodiment of the present invention, the relay node can receive the donor cell configuration information so that the relay node can determine, based on the donor cell configuration information, whether the currently serving cell is the one indicated in the donor cell configuration information, if yes, the relay node may continue working in the cell, otherwise, the relay node access to another cell indicated in the donor cell configuration information. Donor cell configuration information is often configured by the operator according to the real network deployment and the cell is suitable for a relay node to achieve the goal of expanding the coverage range, thus the relay node determines and selects a donor cell according to the donor cell configuration information after network attachment and acquiring the donor cell configuration information. Thereby, in one aspect, the flexibility of donor cell configuration improves the operator's controllability of a relay node, and in a further aspect, the relay node can access to a suitable donor cell as quickly as possible so that the relay node can play its role as soon as possible and the goal of network coverage expansion can be achieved.

A method for a donor cell selection comprises the following steps:

A relay node searches the available cells for the relay node;

The relay node, based on the donor cell configuration information for the relay node, selects a cell from the detected available cells, which is also in the list of cells indicated in the donor cell configuration information, as the donor cell of the relay node.

A relay node apparatus comprises:

A search module for searching the available cells for the relay node;

A selection module for selecting a cell in the list of cells indicated in the donor cell configuration information from the available cells detected by the search module as the donor cell of the relay node, based on the donor cell configuration information of the relay node.

In the aforesaid embodiment of the present invention, by configuring the donor cell configuration information to the relay node and specifying that the relay node selects a donor cell according to the donor cell configuration information from the detected available cells, in one aspect the controllability of the selection of a cell for a relay node is enhanced as the donor cell configuration information can be configured flexibly according to the operator's requirement; in a further aspect, the relay node can access to a specific donor cell quickly when it detects the available cells based on the donor cell configuration information, thereby improving the cell selection accuracy and speeding up the access.

A method for a donor cell selection comprises the following steps:

The relay node searches the available cells for the relay node and sends the information of the available cells to the donor cell selection system;

The relay node receives the donor cell selected by the donor cell selection system from the available cells for the relay node.

A system for a donor cell selection comprises:

A receiving module for receiving the information of the available cells for the relay node detected by the relay node;

A selection module for selecting a donor cell for the relay node from the information of the available cells received by the receiving module;

An indicating module for indicating the information of the donor cell selected by the selection module to the relay node.

In the aforesaid embodiment of the present invention, the relay node sends the information of the detected available cells to the donor cell selection system, from which the system selects a donor cell for the relay node, thereby, in one aspect, providing a flexible way to realize the donor cell selection for the relay node; in a further aspect, usually flexible selection strategies that meet the actual requirement can be adopted when the selection of a donor cell for the relay node is performed by the system. Therefore, the donor cell selected by the system is often a cell satisfying the requirement of the operator, which can enhance the controllability of a donor cell for a relay node. The selection can be performed flexibly according to the requirement.

DETAILED DESCRIPTION OF PREFERRED EMBODIMENTS

Figure 1:
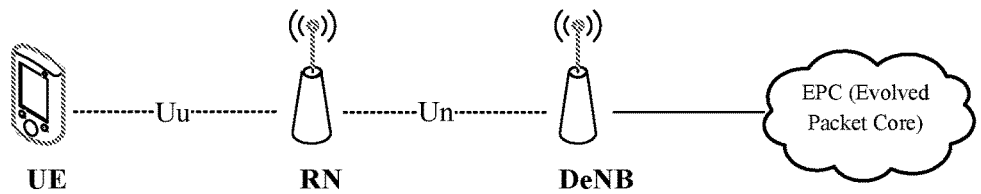
FIG. 1 is LTE-A system architecture diagram with deployed RN in current technology.
Figure 2:
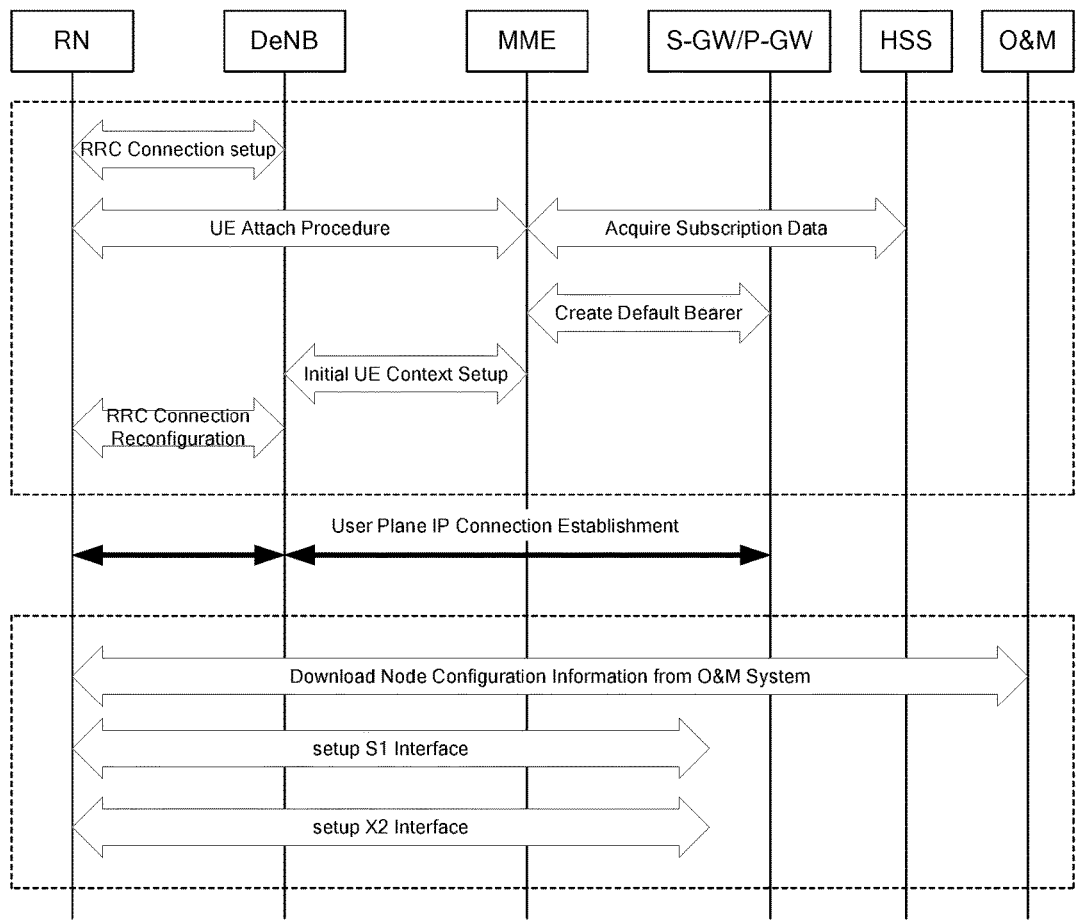
FIG. 2 is a schematic diagram of the RN startup procedure based on candidate architectures 1 and 3 in 3GPP.
Figure 3:
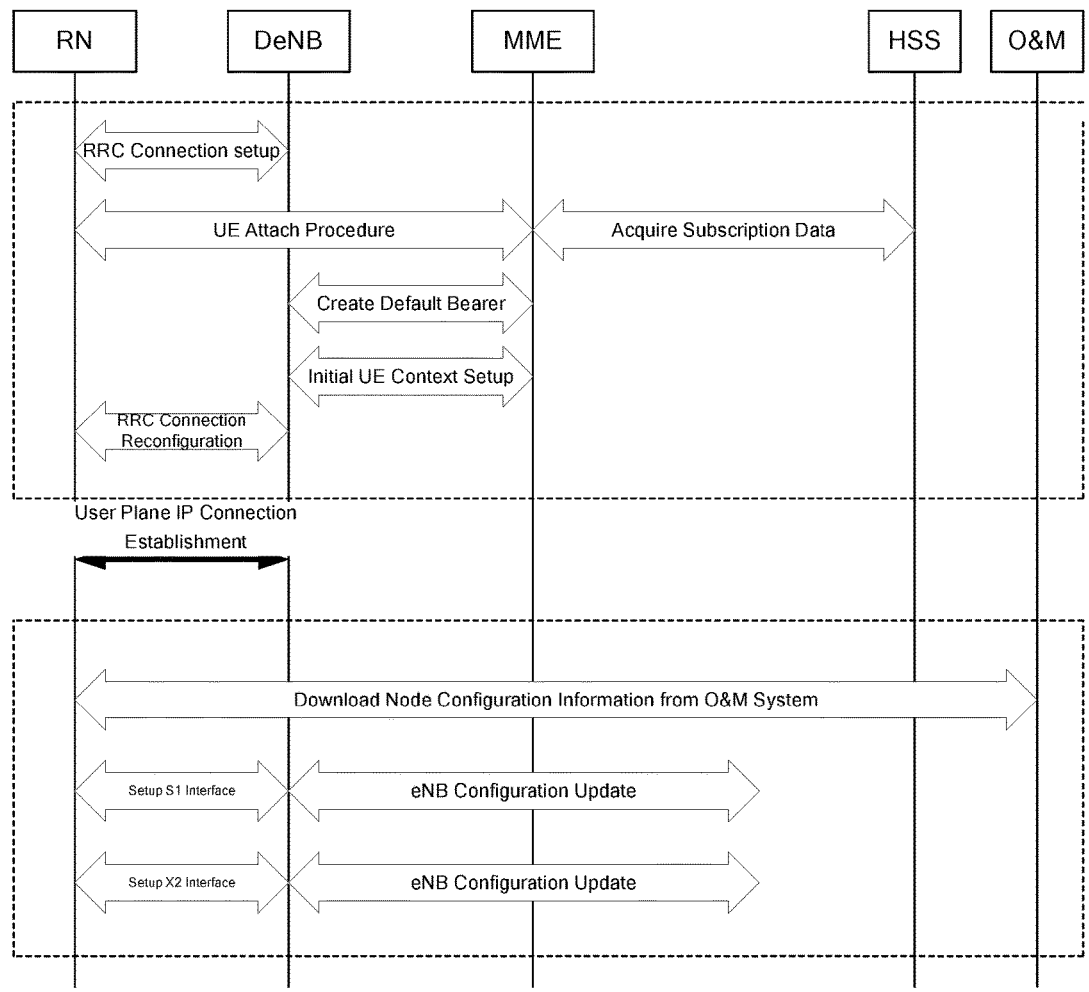
FIG. 3 is the RN startup procedure based on candidate architecture 2 in 3GPP.
Figure 4:
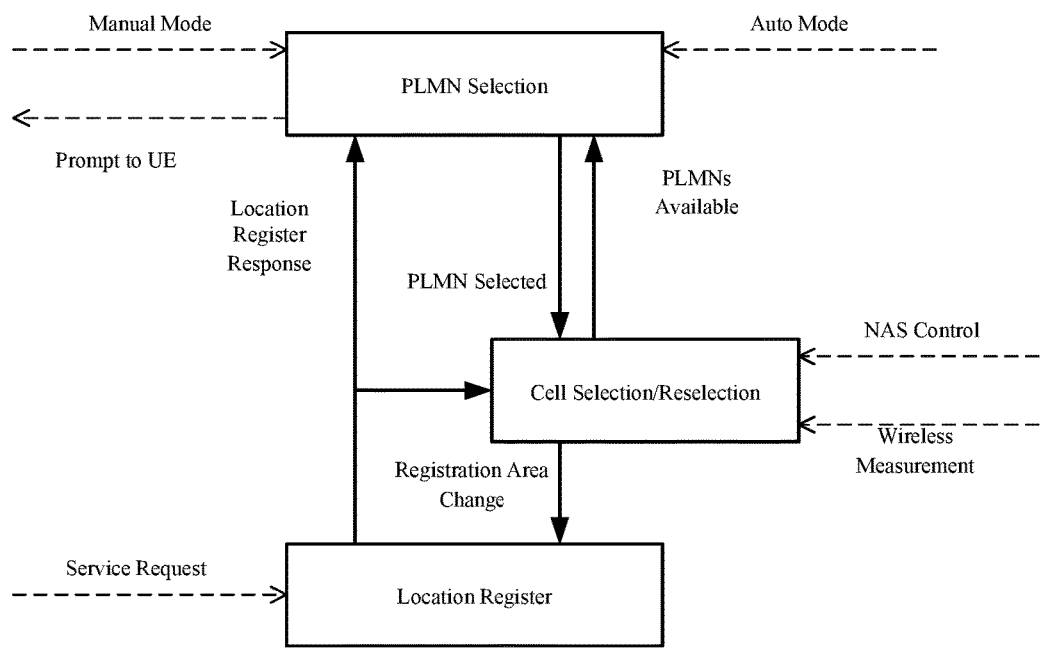
FIG. 4 is a schematic behaviour diagram of a UE in an idle state in the current technology.

For the purpose of solving the aforesaid problems existing in the current technologies, the embodiments of the present invention provide technical solutions for a relay node to select a donor cell. In the technical solutions, the behavior of an RN to select a donor cell may be controlled by the operator, thereby the relay node can access to a suitable donor cell as soon as possible and the goal of network coverage expansion can be achieved. The technical solutions can realize a method or a relay node apparatus for selecting a donor cell for the relay node.

The embodiments of the present invention provide the following technical solutions:

Solution I: an RN selects a cell at first, which can be realized on the basis of the existing UE cell selection procedure; then the RN performs location registration and downloads the donor cell configuration information from O&M, which indicates the donor cell(s) for the RN; afterwards, the RN accesses to corresponding donor cell indicated in the donor cell configuration information. The implementation procedure of the technical solution is described in detail via embodiment I, II and III hereinbelow.

Solution II: pre-configure the donor cell information for the RN to the RN; when the RN searches the available cells, the RN selects a cell indicated in the pre-configured donor cell information to access to. The implementation procedure is described in detail via embodiment IV hereinbelow.

Solution III: the RN, after detecting the available cells, provides the information of the available cells searched to the operator (e.g. it is provided to the operator's donor cell selection system for the RN) to select a donor cell for the RN from them. The RN accesses to the cell selected by the operator. The technical solution is described in detail via embodiment V hereinbelow.

The technical solutions in the present invention are explained in a clear and complete way with reference to the drawings in the present invention. Obviously, the embodiments described hereinbelow are only a plurality of embodiments of the present invention rather than all. All other embodiments gained by those skilled in the art on the basis of the embodiments in the present invention without any creative work shall fall within the protection scope of the present invention.

Embodiment I

After the RN has attached to the network successfully, the O&M system downloads the donor cell configuration information to the RN, which includes donor cell related information for the RN; and then the RN determines, based on the downloaded donor cell configuration information, whether the currently serving cell is a donor cell indicated in the donor cell configuration information. If yes, the RN may continue to work in the cell; otherwise, the RN accesses to another donor cell indicated in the donor cell configuration information via cell reselection (or selection, the same hereinbelow) procedure. Wherein, the initial network attachment of the RN can be realized based on the existing attachment procedure of a UE.

Figure 9:
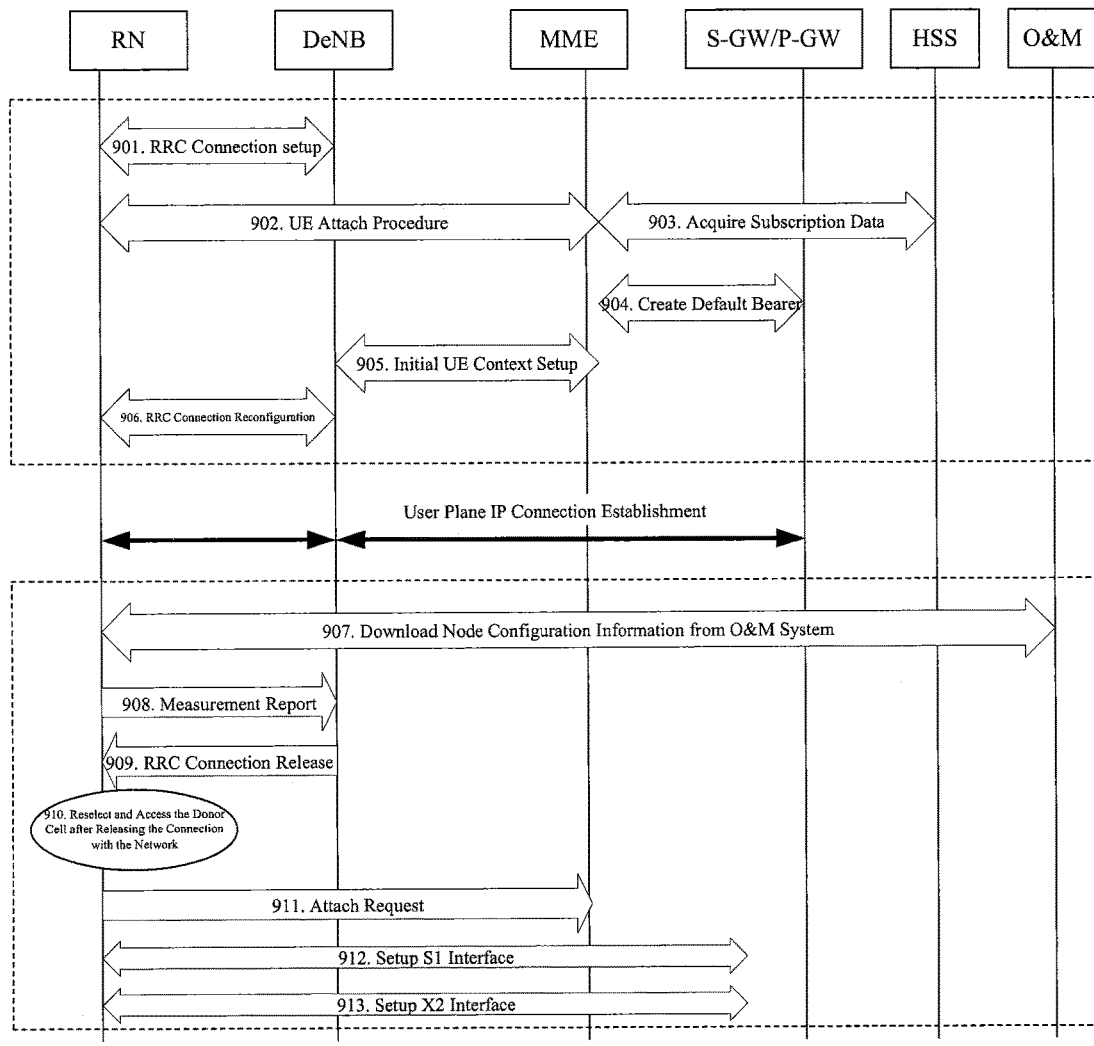
FIG. 9 is a flow diagram of the selection of a donor cell by an RN provided in the embodiment III of the present invention.

As shown in FIG. 9, embodiment I is based on the candidate architectures 1 and 3 of 3GPP, which can comprise:

Step 501: RRC connection is established between the RN and the DeNB.

Step 502: the RN sends attach request to the MME serving the RN.

Step 503: the MME acquires the subscription data of the RN from the HSS for the verification of RN.

Step 504: if the verification is successful, the MME creates default bearer in the S-GW/P-GW of the RN for the RN.

Step 505: the MME sends an initial UE context setup request message to the DeNB and create context of the RN in the DeNB.

Step 506: the DeNB sends a RRC connection reconfiguration message to the RN, which contains an Attach accept message sent to the RN from the MME, and the RN returns RRC connection reconfiguration complete for confirmation.

Through step 501~506, the RN establishes the basic IP connection.

Step 507: the O&M system downloads the donor cell configuration information to the RN.

The donor cell configuration information can include one or more item from the type of cell (macrocell, microcell and relay cell for instance), the frequency of cell, PLMN ID, Physical Layer Cell ID (PCI), Cell ID and E-UTRAN Cell Global ID (ECGI).

Step 508: if the RN determines that the currently connected cell is not indicated in the donor cell configuration information (for example, the ID of the current cell is not equal to anyone in the donor cell configuration information), the RN releases the connection with the network, and then reselect a donor cell indicated in the donor cell configuration information. Through this step, the RN can select a suitable donor cell.

Step 509: the RN requests the MME to activate or establish EPS bearer, and connects to the cell.

The RN can send attach request, service request or location update with active flag to MME to activate or establish EPS bearer.

Step 510~511: the RN operates normally as an eNB after necessary X2 or/and S1 interface is established.

If the RN, after receiving the donor cell configuration information, determines that the serving cell is in the list of donor cells indicated in the donor cell configuration information, the RN can continue to work in the cell. At next, the RN can initiate a request for establishing necessary X2/S1 interface and operate normally as an eNB.

Figure 5:
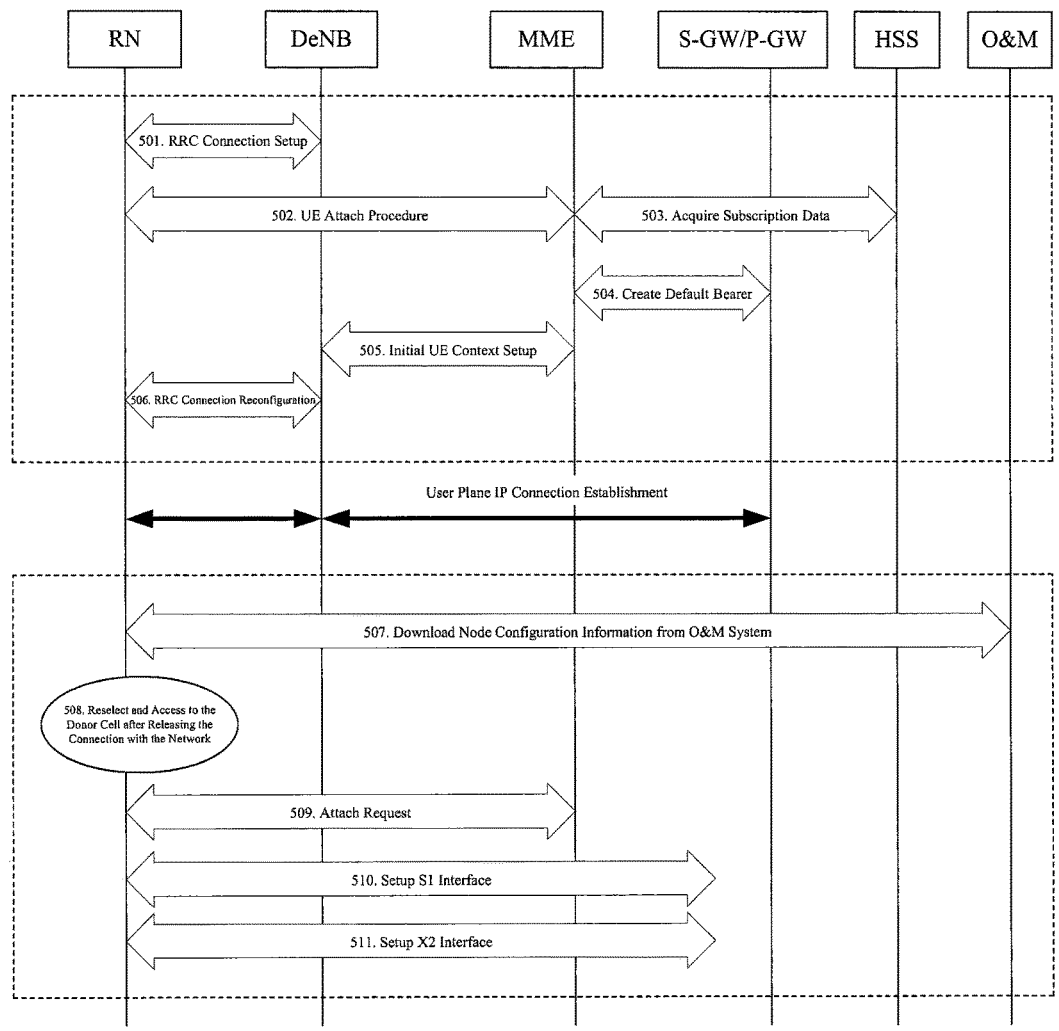
FIG. 5 is a flow diagram of the selection of a donor cell by an RN provided in the embodiment I of the present invention.

The procedures that an RN selects a donor cell based on 3GPP candidate architectures 2 and 4 are similar to the flow as shown in FIG. 5. The difference is that: in architecture 2, in one aspect, the S-GW and P-GW functions of the RN are integrated in the DeNB, thus request of creating default bearer by the MME is sent to DeNB; in a further aspect, RN only needs to establish an X2 interface and an S1 interface with the DeNB.

Based on the technical conceptions that are the same with the embodiment of the present invention, the embodiment of the present invention further provides an RN apparatus which can be used for candidate architectures 1, 2, 3 and 4.

Figure 6:
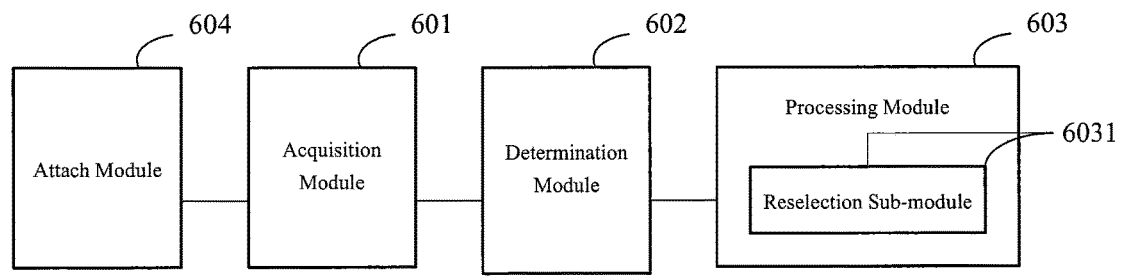
FIG. 6 is a structural diagram of the RN provided in the embodiment I of the present invention.

As shown in FIG. 6, the apparatus can comprise: an acquisition module 601, a determination module 602 and a processing module 603, wherein:

The acquisition module 601 is used for the RN to acquire the donor cell configuration information for the RN;

The determination module 602 is used for instructing the RN to continue working in the cell if it determines, based on the donor cell configuration information acquired by the acquisition module 601, that the current serving cell is a cell indicated in the donor cell configuration information; otherwise, instructing the RN to select another cell indicated in the donor cell configuration information to access;

The processing module 603 is used for causing the RN to continue working in the current cell or connect to another cell indicated in the configured donor cell according to the judgment of the determination module 602.

The processing module 603 can comprise: a reselection sub-module 6031 for connecting the RN to the cell indicated in the donor cell configuration information by performing cell reselection, wherein, the cell reselection procedure can comprise the following steps: the processing module 603 releases the connection with the network; reselects a cell indicated in the donor cell configuration information; and requests the activation or the establishment of EPS bearer.

The aforesaid RN apparatus can also include an attach module 604 for performing network attachment procedure, comprising the following steps: establish the RRC connection with the eNB; and trigger the serving MME to perform: verification for the relay node, create default bearer in the DeNB of the relay node or in the packet data domain gateway or serving gateway of the relay node and create context in the eNB for the relay node.

It can be seen from the embodiment I of the present invention, after the RN attaches to the network successfully, the donor cell configuration information can be downloaded from O&M, thereby the RN can determine whether the currently connected cell is the donor cell configured by the operator for the RN according to the donor cell configuration information. If no, the RN reselects another donor cell indicated in the donor cell configuration information. Thereby, in one aspect, it can improve the controllability of a donor cell selection by the RN; in a further aspect, it can enhance the accuracy of the donor cell selection by the RN; in still a further aspect, it speed up the time to access to the donor cell as the RN can determine whether the current cell is the donor cell indicated by the operator according to the donor cell configuration information quickly. Embodiment I of the present invention can be applied to all candidate relay architectures in 3GPP.

Embodiment II

After the RN has attached to the network successfully, the O&M system downloads the donor cell configuration information to the RN, which includes the donor cell related information for the RN; and then the RN determines, based on the downloaded donor cell configuration information, whether the currently connected cell is the donor cell indicated in the donor cell configuration information, if yes, the RN may continue working in the cell; otherwise, the RN selects another donor cell indicated in the donor cell configuration information via inter-cell handover procedure. Wherein, the initial network attachment of the RN can be realized by reference to the existing network attachment of a UE.

Figure 7:
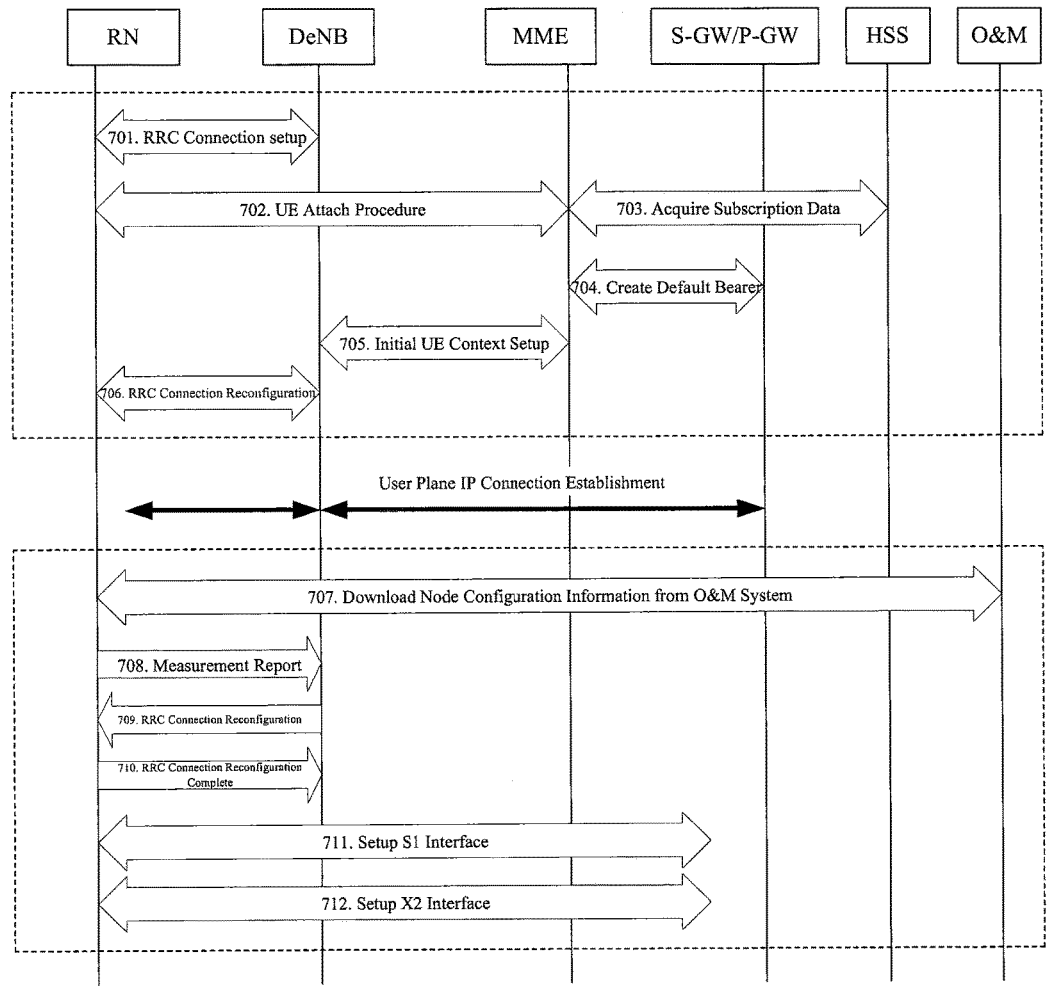
FIG. 7 is a flow diagram of the selection of a donor cell by an RN provided in the embodiment II of the present invention.

As shown in FIG. 7, embodiment II is based on candidate relay architectures 1 and 3 in 3GPP, which can comprise:

Step 701~706: the RN attaches to the network to establish the basic IP connection. The flow is similar to the corresponding steps as shown in FIG. 5 and is not described hereinbelow.

Step 707: after the RN has attached to the network successfully, the O&M system downloads the donor cell configuration information to the RN.

The donor cell configuration information can include one or more items from: the type of cell (macrocell, microcell and relay cell for instance), the frequency of cell, PLMN ID, Physical Layer Cell ID (PCI), Cell ID and E-UTRAN Cell Global ID (ECGI).

Step 708~710: if the RN determines that the current serving cell is not a donor cell indicated in the donor cell configuration information (for example, the ID of the current cell is not equal to anyone in the donor cell configuration information), the RN sends uplink RRC message to the DeNB to trigger the DeNB to hand over the relay node to the donor cell indicated in the donor cell configuration information. Through this step, the RN selects the suitable donor cell.

Wherein, the uplink RRC message sent to the DeNB by the RN can be Measurement Report or other RRC messages that includes donor cell information and the uplink RRC message is used to guide the DeNB to hand over the relay node to the donor cell indicated in the donor cell information.

Step 711~712: the RN operates normally as an eNB after having accessed to the donor cell and established necessary X2/S1 interface.

If the RN, after receiving the donor cell configuration information, determines that the current serving cell is listed in donor cell configuration information, it means that the cell is a allowable donor cell and the RN can continue working in the cell. At next the RN can initiate a request for establishing necessary X2/S1 interface to enter the role of an eNB.

If the reported donor cell is not under the current DeNB, the current DeNB needs to initiate X2/S1 handover procedure to hand over the relay node to the DeNB managing the reported donor cell. The procedure can be realized by reusing the existing X2/S1 handover procedure.

The procedures that an RN selects a donor cell based on candidate architectures 2 and 4 are similar to the flow as shown in FIG. 7.

Based on the technical conceptions that are the same with the embodiment of the present invention, the embodiment of the present invention further provides an RN apparatus which can be used for all candidate architectures 1, 2, 3 and 4.

Figure 8:
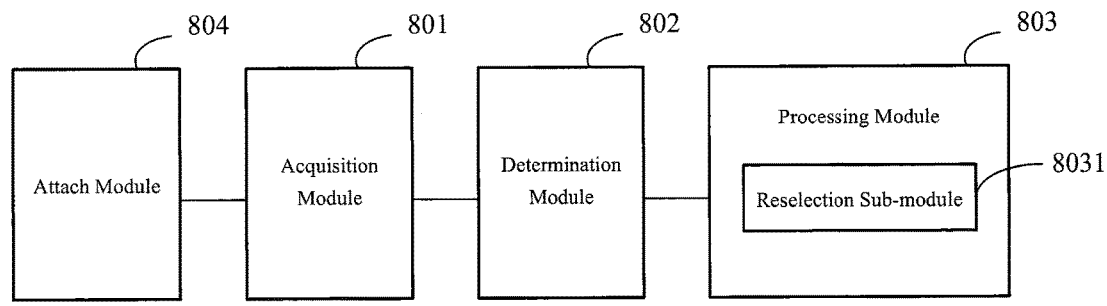
FIG. 8 is a structural diagram of the RN provided in the embodiment II of the present invention.

As shown in FIG. 8, the apparatus can comprise: an acquisition module 801, a determination module 802 and a processing module 803, wherein:

The acquisition module 801 is used for the RN to acquire the donor cell configuration information for the RN;

The determination module 802 is used for instructing the RN to continue working in the cell if it determines, based on the donor cell configuration information acquired by the acquisition module 801, that the current serving cell is a cell indicated in the donor cell configuration information; otherwise, instructing the RN to select the cell indicated in the donor cell configuration information to access to;

The processing module 803 is used for causing the RN to continue working in the current cell or connecting the RN to the cell indicated in the configured donor cell according to the judgment of the determination module 802.

The processing module 803 can comprise: a handover sub-module 8031 for connecting the RN to the cell indicated in the donor cell configuration information by performing handover, wherein, the handover procedure can comprise the following steps: the processing module 803 sends the donor cell configuration information to the eNB, to trigger the eNB to hand over the relay node to corresponding cell according to the received cell information.

The aforesaid RN apparatus can also include an attach module 804 for performing network attachment procedure, comprising the following steps: establish the RRC connection with the eNB; and trigger the serving MME to perform: verification for the relay node, create default bearer in the DeNB of the relay node or in the packet data domain gateway or serving gateway of the relay node and create context in the eNB for the relay node.

It can be seen from the embodiment II of the present invention, after the RN has attached to the network successfully, the donor cell configuration information can be downloaded from O&M, thereby the RN may determine whether the current serving cell is the donor cell configured by the operator for the RN according to the donor cell configuration information. If no, the RN accesses to the donor cell indicated in the donor cell configuration information via inter-cell handover procedure. Thereby, in one aspect, it can improve the controllability of the donor cell selection by the RN; in a further aspect, it can enhance the accuracy of donor cell selection; in still a further aspect, it also speeds up the period to access to the donor cell because the RN can determine whether the current cell is the donor cell indicated by the operator according to the donor cell configuration information and can be handed over to the donor cell quickly via inter-cell handover. Embodiment II of the present invention can be applied to all candidate relay architectures in 3GPP.

Embodiment III

After the RN attaches to the network successfully, the O&M system downloads the donor cell configuration information to the RN, which includes the donor cell related information for the RN; and then the RN determines, based on the downloaded donor cell configuration information, whether the current serving cell is the donor cell indicated in the donor cell configuration information, if yes, the RN may continue working in the cell; otherwise, the RN accesses to a donor cell indicated in the donor cell configuration information via cell reselection procedure. Wherein, the initial network attachment of the RN can be realized by reusing the existing UE attachment.

As shown in FIG. 9, embodiment III is based on the candidate relay architecture candidates 1 and 3 in 3GPP, which can comprise:

Step 901~906: the RN attaches to the network to establish the basic IP connection. The flow is similar to the corresponding steps as shown in FIG. 5 and is not described hereinbelow.

Step 907: after the RN has attached to the network successfully, the O&M system downloads the donor cell configuration information to the RN.

The donor cell configuration information can include one or more items such as the type of cell (macrocell, microcell and relay cell for instance), the frequency of cell, PLMN ID, Physical Layer Cell ID (PCI), Cell ID and E-UTRAN Cell Global ID (ECGI).

Step 908: if the RN determines that the current serving cell is not listed in the donor cell configuration information (for example, the ID of the current cell is not equal to anyone in the donor cell configuration information), the RN sends uplink RRC message to the DeNB to trigger the DeNB to redirect the RN to a donor cell indicated in the donor cell configuration information. Through this step, the RN selects the suitable donor cell to access.

Wherein, the uplink RRC message sent to the DeNB by the RN can be Measurement Report or other RRC messages including donor cell information and the uplink RRC message is used to guide the DeNB to redirect the RN to a donor cell indicated in the donor cell information.

Step 909: the DeNB sends RRC connection release message to the RN, for example, RRC connection release message, wherein, the redirection information element (IE) includes the donor cell information received in the uplink RRC message.

Step 910: the RN releases the connection with the network, and reselects and accesses to the donor cell according to the RRC connection release message.

Step 911~913 are the same with step 509~511 and are not described hereinbelow.

If the RN determines that the current serving cell is listed in the donor cell configuration information after receiving the donor cell configuration information, the RN may continue working in the cell. At next, the RN can initiate a request for establishing necessary X2/S1 interface to operate as an eNB.

If the reported donor cell is not under the current DeNB, the current DeNB needs to initiate X2/S1 handover procedure to hand over the relay node to the DeNB managing the reported donor cell. The procedure can be realized by reusing the existing X2/S1 handover procedure.

The embodiment of the present invention further provides a relay node apparatus, which is similar to the relay node apparatus as shown in FIG. 6. What is different is that: the reselection sub-module executes cell reselection. The specific implementation is as shown in FIG. 9 and is not described hereinbelow.

The embodiment of the present invention further provides an eNB apparatus for redirecting or handing over the RN to the cell indicate in the donor cell configuration information for the RN when the RN selects a donor cell.

Figure 10:
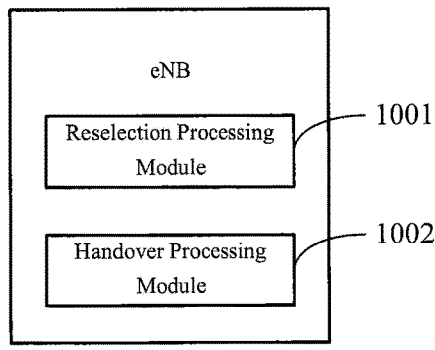
FIG. 10 is a structural diagram of the eNB apparatus provided in the embodiment III of the present invention.

As shown in FIG. 10, the eNB apparatus can comprise one or both of the following modules:

A reselection processing module 1001 for instructing the RN to reselect the cell indicated in the donor cell configuration information according to the donor cell configuration information reported by the RN; the cell reselection can be performed referring to the procedure as shown in FIG. 5 or FIG. 9;

A handover processing module 1002 for handing over the RN to the cell indicated in the donor cell configuration information according to the donor cell configuration information sent from the RN. The cell handover can be performed using the procedure as shown in FIG. 7.

Wherein, the reselection processing module 1001 can receive the RRC message including the donor cell configuration information from the RN; and send an RRC connection release message with the donor cell configuration information for the RN to the RN, to instruct the RN to release the current connection with the network side, and cause the RN to reselect and access to the cell indicated in the donor cell configuration information.

It can be noted that the FIG. 5, FIG. 7 and FIG. 9 provided in the aforesaid embodiments are described by taking the procedure that the RN selects the donor cell according to the donor cell configuration information sent from the network side after the RN starts up and attaches to the network as an example, in fact, except at the RN startup procedure, for example, when the network side updates the donor cell configuration information and sends the updated donor cell configuration information to the RN, the RN can also determine whether the currently serving cell is a suitable donor cell according to the updated donor cell configuration information, thus achieving the goal of determining the donor cell of the RN according to the donor cell configuration information.

Embodiment IV

In the embodiment IV, the donor cell configuration information can be sent to the RN in advance, causing the RN to select the cell indicated in the donor configuration information from the available cells as the donor cell for the RN according to the donor cell configuration information after the RN powers up.

Figure 11:
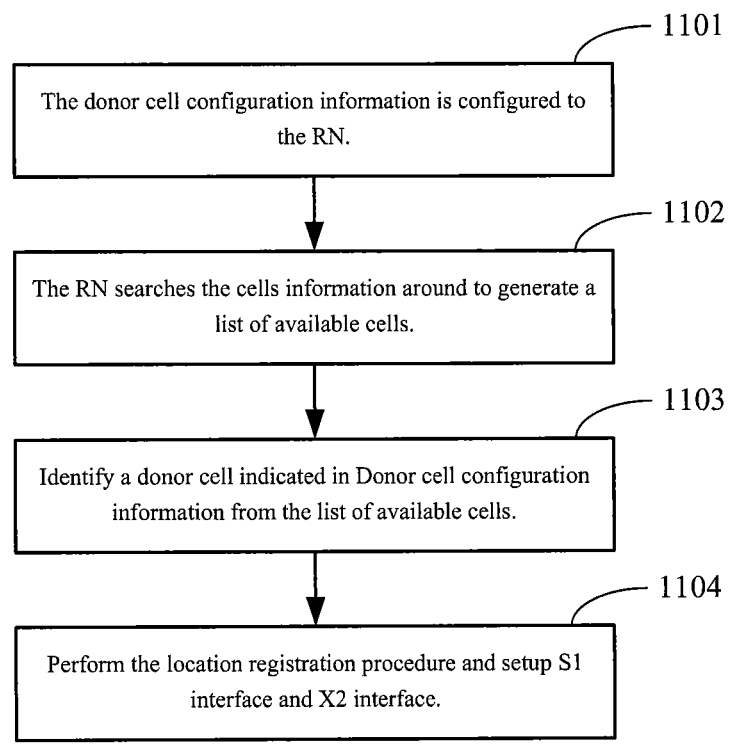
FIG. 11 is a flow diagram of the selection of a donor cell by an RN provided in the embodiment IV of the present invention.

As shown in FIG. 11, the flow can comprise the following steps:

Step 1101: donor cell configuration information is configured to the RN.

Wherein, the method to configure donor cell information to the RN may be: to be written in the RN via software in advance, or to be read from an external memory medium when the RN starts up, for example, a USB flash disk, a data card, etc. the donor cell information can be stored in the Universal Subscriber Identity Module (USIM) card of the RN or other stable memory blocks. The network side can download the latest donor cell configuration information to the RN according to requirement.

The donor cell configuration information can include one or more items such as the type of cell, the frequency of cell, PLMN, PCI, Cell ID, ECGI, etc.

Step 1102: after starting up, the RN searches the cell information and generates a list of available cells;

Step 1103, the RN finds out the donor cell indicated in the pre-configured donor cell configuration information from the list of available cells according to the donor cell configuration information.

Wherein, if the RN finds out more than one donor cells (donor cell configuration information can indicate a list of donor cells), the method to select the donor cell therefrom can be: to select the donor cell with the best signal quality or select according to the priority of donor cells, etc.

Step 1104: the RN performs location registration procedure to register to the selected donor cell and establish necessary S1 or/and X2 interfaces, thus causing the RN to enter into the working status of an eNB.

The RN can also directly select the cell to access after reading the PLMN and Cell ID of the donor cell from the system information thereby simplifying the interaction between AS and NAS. In this process, if the RN finds out more than one donor cells, the RN can select and camp on the most suitable donor cell (the donor cell with the best signal quality for instance) and perform the location registration.

The method provided in the embodiment V can also be implemented for selecting a cell when the RN needs to select a donor cell at other times, RRC connection re-establishment for instance.

Based on the technical conceptions that are the same with the embodiment of the present invention, the embodiment of the present invention further provides an RN apparatus which is applicable to all candidate architectures in 3GPP.

Figure 12:
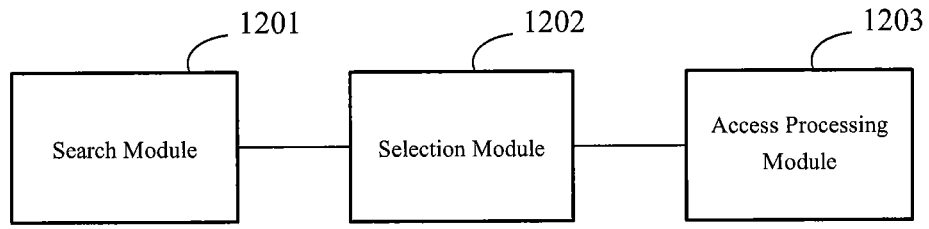
FIG. 12 is a structural diagram of the RN provided in the embodiment IV of the present invention.

As shown in FIG. 12, the RN apparatus can comprise: a search module 1201 and a selection module 1202, wherein:

The search module 1201 used for searching the available cells of the RN;

The selection module 1202 is used for selecting a cell that is listed in the donor cell configuration information, from the available cells detected by the search module 1201 as the donor cell for the RN according to the donor cell configuration information.

If more than one cells among the detected cells are listed in the donor cell configuration information, the selection module 1202 can also select a cell from them as the donor cell of the RN according to the signal quality or priority, etc.

The RN apparatus can also comprise an access processing module 1203 for processing cell access, particularly, for causing the RN to access the donor cell selected by the selection module 1202, for example, cell registration, etc.

It can be seen from the embodiment IV of the present invention that by pre-configuring the donor cell configuration information to the RN and ensuring that the RN selects a donor cell according to the donor cell configuration information after the available cells are detected, in an aspect, the controllability of the donor cell selection procedure is enhanced as the donor cell configuration information can be set flexibly according to the operator's requirement; in a further aspect, the RN can access to the configured donor cell rapidly as the RN performs cell registration after selecting the donor cell configured by the operator via the donor cell configuration information from the detected cells, thus improving the accuracy of access while increasing the speed to access. The embodiment of the invention is of high flexibility since the embodiment is applicable to all candidate architectures in 3GPP.

Embodiment V

In the embodiment V, the RN can provide relevant information of the detected cells to the operator after the RN starts up, and the operator selects a suitable cell from the cells reported from the RN as the donor cell for the RN.

Figure 13:
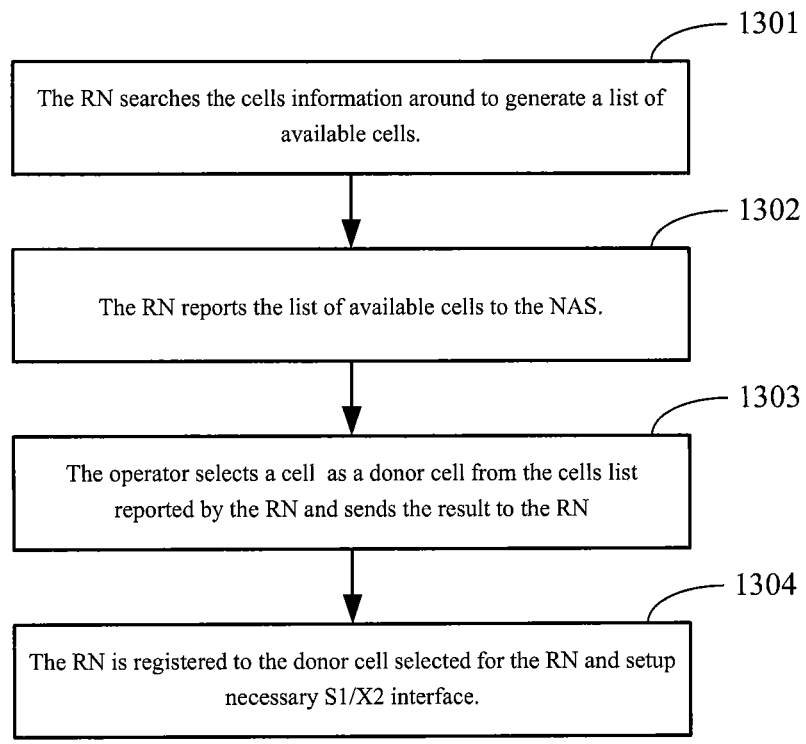
FIG. 13 is a flow diagram of the selection of a donor cell by an RN provided in the embodiment V of the present invention.

As shown in FIG. 13, the flow can comprise the following steps:

Step 1301: after starting up, the RN searches the cell information and generates a list of available cells;

Step 1302: the RN reports the list of available cells to the NAS.

The reported cell information can comprise one or more items from the type of cell, the frequency of cell, PLMN ID, PCI, Cell ID, ECGI, signal quality, signal to noise ratio, etc.

Step 1303: the operator selects a cell from the cells reported from the RN as a donor cell and sends the result to the RN.

Thus, the operator selects a donor cell for the RN.

Step 1304: the RN registers to the donor cell selected for the RN and establishes necessary S1/X2 interface, thus the RN can enter the role of an eNB.

In the aforesaid flow, the NAS can display the list of the cells reported from the RN on the man-machine interface or other visible substance for the selection of a donor cell for the RN, so that the operator (e.g. system administrator) can select the donor cell of the RN from the list of cells. The NAS can also submit the list of cells reported by the RN to the management system for the selection of a donor cell for the RN, and the management system selects a donor cell for the RN. When selecting a donor cell for the RN, the management system can select the cell indicated in the donor cell configuration information from the cells reported by the RN as the donor cell for the RN; the management system can also select a donor cell according to the selection strategy made by the operator, e.g. selecting a cell with better signal quality, a cell with higher signal to noise ratio or other operator strategies.

The method provided in the embodiment IV can also be implemented for selecting a cell when the RN needs to select a donor cell at other times, RRC connection re-establishment for instance.

Based on the technical conceptions that are the same with the embodiment of the present invention, the embodiment of the present invention further provides a system for selecting a donor cell.

Figure 14:
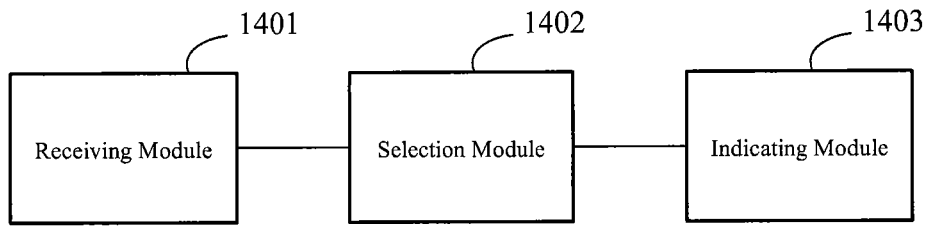
FIG. 14 is a structural diagram of the system for selecting a donor cell provided in the embodiment V of the present invention.

As shown in FIG. 14, the system can comprise: a receiving module 1401 and a selection module 1402, wherein:

The receiving module 1401 is used for receiving the information of the available cells detected by the relay node;

The selection module 1402 is used for selecting a donor cell for the relay node from the available cells received by the receiving module 1201. Specifically, the selection module 1402 can select a donor cell for the relay node according to the choice of a user from the received available cells; the selection module 1402 can also select a cell that is listed in the donor cell configuration information, from the available cells as the donor cell for the relay node.

The indicating module 1403 is used for indicating the information of the donor cell selected by the selection module 1402 to the relay node.

It can be seen from the embodiment V of the present invention that the RN sends the information of the available cells to the NAS or the management system, which selects a donor cell for the RN. The selection of a cell by the system for the RN can be of manual type, i.e. the system administrator select a suitable donor cell for the RN from the available cells, thus enhancing the controllability of a donor cell selection by the RN, the selection can be performed flexibly according to the requirement. The of a cell by the system for the RN can also be of non-manual type, for example, the system automatically selects a donor cell for RN from the selectable cells according to the donor cell configuration information, thus improving the efficiency of the selection of the a donor cell.

It can be noted that the aforesaid embodiment is described by taking the donor cell selection by a relay node as an example and it is to be understood that when the relay node selects a donor cell to access, the relay node is equivalent to a user equipment. The selection of a donor cell described in the aforesaid embodiment is not only applicable to relay nodes, but also to user equipments of other type or other network equipments with a role of user equipment.

With the description of the preferred embodiments hereinabove, those skilled in the art can clearly understand that the present invention can be realized with the aid of software and necessary commonly used hardware platforms, or the aid of hardware of course, but the former is a preferred embodiment in most cases. Based on this understanding, the technical proposal of the present invention or the part contributing to the prior art can be reflected in the form of a software product, which is saved in a memory medium comprising instructions to enable a terminal equipment, which could be a cell phone, a personal computer, a server or a network device, to carry out the methods for each embodiment of the present invention.

The description hereinabove is only preferred embodiments of the present invention and it is to be noted that those of ordinary skill in the art can also make a plurality of improvements without departing from the principle of the present invention. These improvements are still under the scope of the present invention.

The invention claimed is:

1. A method for selecting a donor cell, comprising:
  acquiring, by a relay node donor cell configuration information for the relay node;
  continuing to work in a cell to which the relay node currently connects, if the relay node determines, based on the donor cell configuration information, that the cell to which the relay node currently connects is comprised of donor cells indicated in the donor cell configuration information; or
  selecting, by the relay node, one of the donor cells indicated in the donor cell configuration information to access, if the relay node determines, based on the donor cell configuration information, that the cell to which the relay node currently connects is not comprised of the donor cells indicated in the donor cell configuration information.

2. The method as claimed in claim 1, wherein the selecting, by the relay node, one of the donor cells indicated in the donor cell configuration information to access, comprises:
  accessing one of the donor cells indicated in the donor cell configuration information, by the relay node through performing a cell selection or a cell handover.

3. The method as claimed in claim 2, wherein the cell selection comprises:
  releasing, by the relay node, a current radio resource control (RRC) connection;
  selecting, by the relay node, one of the donor cells indicated in the donor cell configuration information according to the donor cell configuration information; and
  requesting, by the relay node, activation or establishment of an evolved packet system (EPS) bearer, and accessing one of the donor cells by the relay node.

4. The method as claimed in claim 2, wherein the cell selection comprises:
  sending, by the relay node, a radio resource control (RRC) message to a serving evolved Node B (eNB), the RRC message carrying the donor cell configuration information for the relay node;

sending, by the serving eNB, a RRC connection release message to the relay node, the RRC connection release message carrying the donor cell configuration information for the relay node;

releasing a current RRC connection, according to the RRC connection release message, selecting, by the relay node, one of the donor cells indicated in the acquired donor cell configuration information according to the donor cell configuration information, and requesting, by the relay node, activation or establishment of an evolved packet system (EPS) bearer to access one of the donor cells.

5. The method as claimed in claim 2, wherein the cell handover comprises:

sending, by the relay node, information of the donor cells indicated in the donor cell configuration information to an evolved Node B (eNB); and handing over the relay node to a corresponding cell by the eNB according to the received information of the donor cells.

6. The method as claimed in claim 1, wherein the relay node acquires the donor cell configuration information for the relay node from an operation and maintenance (O&M) system.

7. The method as claimed in claim 1, wherein the donor cell configuration information comprises one or any combination of: a type of donor cell for the relay node, a public land mobile network identifier (PLMN ID) of the donor cell for the relay node, a frequency of the donor cell for the relay node and a cell identifier (Cell ID) of the donor cell for the relay node.

8. A relay node apparatus, comprising: a computer processor and a computer-readable storage medium which stores a plurality of computer-executable instructions, which when being executed by the computer processor, cause the computer processor to:

acquire the donor cell configuration information for the relay node;

determine, based on the donor cell configuration information, whether a cell to which the relay node currently connects is comprised of donor cells indicated in the donor cell configuration information;

instruct the relay node to continue working in a cell to which the relay node currently connects if it is determined, based on the donor cell configuration information, that the cell to which the relay node currently connects is comprised of donor cells indicated in the donor cell configuration information; or instruct the relay node to select one of the donor cells indicated in the donor cell configuration information to access, if it is determined, based on the donor cell configuration information, that the cell to which the relay node currently connects is not comprised of the donor cells indicated in the donor cell configuration information; and cause the relay node to continue working in the cell to which the relay node currently connects or cause the relay node to access one of the donor cells indicated in the donor cell configuration cell, according to a determination result.

9. The relay node apparatus as claimed in claim 8, wherein the computer-executable instructions, when being executed by the computer processor, cause the computer processor to:

cause the relay node to access one of the donor cells indicated in the donor cell configuration information by performing a cell selection, or cause the relay node to access one of the donor cells indicated in the donor cell configuration information by performing a cell handover.

10. The relay node apparatus as claimed in claim 9, wherein the computer-executable instructions, when being executed by the computer processor, cause the computer processor to release a current radio resource control (RRC) connection; select one of the donor cells indicated in the donor cell configuration information according to the donor cell configuration information; and request activation or establishment of an evolved packet system (EPS) bearer to access one of the donor cells; or send an RRC message to an evolved Node B (eNB) to trigger the eNB to send an RRC connection release message to the relay node, the RRC message carrying the donor cell configuration information for the relay node; release a current RRC connection according to the RRC connection release message sent by the eNB; select one of the donor cells indicated in the donor cell configuration information according to the donor cell configuration information; and request activation or establishment of an EPS bearer to access one of the donor cells.

11. The relay node apparatus as claimed in claim 9, wherein the computer-executable instructions, when being executed by the computer processor, cause the computer processor to send information of the donor cells indicated in the donor cell configuration information to an eNB to trigger an eNB to hand over the relay node to a corresponding cell according to the received information of the donor cells.

12. A method for selecting a donor cell, comprising:

searching for available cells for a relay node; and selecting, from the available cells by the relay node, a cell which is comprised in a cell list indicated in a donor cell configuration information;

wherein if a plurality of cells among the available cells are comprised in the cell list indicated in the donor cell configuration information, the relay node selects one cell, from the plurality of cells, as the donor cell for the relay node according to a donor cell selection strategy.

13. The method as claimed in claim 12, wherein the donor cell selection strategy comprises: selecting a cell with a better signal quality or a higher priority.

14. The method as claimed in claim 12, wherein the donor cell configuration information comprises one or any combination of: a type of donor cell for the relay node, a public land mobile network identifier (PLMN ID) of the donor cell for the relay node, a frequency of the donor cell for the relay node and cell identifier (Cell ID) of the donor cell for the relay node.

15. The method as claimed in claim 13, wherein the donor cell configuration information comprises one or any combination of: a type of donor cell for the relay node, a public land mobile network identifier (PLMN ID) of the donor cell for the relay node, a frequency of the donor cell for the relay node and Cell ID of the donor cell for the relay node.

* * * * *